United States Patent
Wu et al.

(10) Patent No.: US 7,852,861 B2
(45) Date of Patent: Dec. 14, 2010

(54) DYNAMIC SYSTEM AND METHOD FOR VIRTUAL PRIVATE NETWORK (VPN) APPLICATION LEVEL CONTENT ROUTING USING DUAL-PROXY METHOD

(75) Inventors: Michael Wu, San Jose, CA (US);
Arthur Chang, Fremont, CA (US);
Leemay Yen, San Jose, CA (US);
Nai-Ting Hsu, Saratoga, CA (US)

(73) Assignee: Array Networks, Inc., Milpitas, CA (US)

( * ) Notice: Subject to any disclaimer, the term of this patent is extended or adjusted under 35 U.S.C. 154(b) by 691 days.

(21) Appl. No.: 11/639,561

(22) Filed: Dec. 14, 2006

(65) Prior Publication Data

US 2008/0144625 A1 Jun. 19, 2008

(51) Int. Cl.
*H04L 12/28* (2006.01)
(52) U.S. Cl. ........................................ 370/401
(58) Field of Classification Search ............... 370/254, 370/401, 395.53; 726/2, 15, 17, 27, 14, 12, 726/13
See application file for complete search history.

(56) References Cited

U.S. PATENT DOCUMENTS

| | | | |
|---|---|---|---|
| 6,804,777 B2 | 10/2004 | Hollis et al. | |
| 6,816,882 B1 | 11/2004 | Conner et al. | |
| 7,185,106 B1 | 2/2007 | Moberg et al. | |
| 7,315,888 B2 | 1/2008 | Shibata | |
| 2002/0186698 A1 | 12/2002 | Ceniza | |
| 2003/0185207 A1 | 10/2003 | Nakahara | |
| 2004/0162992 A1* | 8/2004 | Sami et al. | 713/200 |
| 2004/0209613 A1 | 10/2004 | Hunter et al. | |
| 2004/0218611 A1* | 11/2004 | Kim | 370/401 |
| 2004/0268148 A1 | 12/2004 | Karjala et al. | |
| 2005/0088977 A1* | 4/2005 | Roch et al. | 370/254 |
| 2005/0190705 A1 | 9/2005 | Moore et al. | |
| 2005/0198491 A1* | 9/2005 | Lee et al. | 713/151 |
| 2005/0273849 A1* | 12/2005 | Araujo et al. | 726/12 |
| 2006/0227758 A1* | 10/2006 | Rana et al. | 370/351 |
| 2007/0081530 A1 | 4/2007 | Nomura et al. | |
| 2007/0153782 A1 | 7/2007 | Fletcher et al. | |

OTHER PUBLICATIONS

Wikipedia, Network Address Translation, Jul. 2006.
R. Droms, "RFC 2131: Dynamic Host Configuration Protocol,"Mar. 1997, Network Working Group, p. 1-46.
P. Mockapetris, "RFC 1035; Domain Names—Implementation and Specification,"Nov. 1987, Network Working Group, p. 1-56.
PC Magazine, Node Definition from PC Magazine Encyclopedia, Jul. 2009.
P. Mockapetris, "RFC 1034: Domain Names Concepts and Facilities," Nov. 1987, pp. 1-55.

* cited by examiner

*Primary Examiner*—Dang T Ton
*Assistant Examiner*—Kevin Lee
(74) *Attorney, Agent, or Firm*—Buchanan Ingersoll & Rooney PC

(57) ABSTRACT

A method of application level content routing using a (Dynamic VPN) dual-proxy mechanism that provides a client access to resources on a remote network without exposing each other's actual IP addresses and network topologies. The method includes providing a client a list of available resources on a remote network; initiating a request by the client for at least one resource from the list of available resources hosted on the remote network as though the at least one resource is local to the client; routing the request to the at least remote resource through a secure connection between the client and the remote network; responding to the request by the at least remote resource as though the request is initiated locally on the remote network; and routing the response from the remote network back to the client through the secure connection.

26 Claims, 7 Drawing Sheets

| | Client Group | Resource Group | IP pool | Tunnel |
|---|---|---|---|---|
| x.com<br>↑<br>20 | a1.x.com<br>a2.x.com | sv1.y.com:2121<br>sv1.y.com:2020<br><br>sv1.z.com:2121<br>sv1.z.com:2020 | 10.1.1.20<br><br><br>10.1.1.21 | vpn.y.com:443 |
| y.com<br>↑<br>50 | a1.x.com<br>a2.x.com | sv1.y.com:2121<br>(10.2.1.200:21)<br>svl.y.com:2020<br>(10.2.1.200:20) | 10.2.1.11-12 | vpn.x.com:443<br><br><br>vpn.z.com:444 |
| z.com<br>↑<br>400 | a1.x.com<br>a2.x.com | sv1.z.com:2121<br>(10.3.1.200:21)<br>svl.z.com:2020<br>(10.3.1.200:20) | 10.3.1.11-12 | vpn.y.com:444 |

DYNAMIC SYSTEM AND METHOD FOR VIRTUAL PRIVATE NETWORK (VPN) APPLICATION LEVEL CONTENT ROUTING USING DUAL-PROXY METHOD

FIELD OF THE INVENTION

This invention generally relates to a system and method for a virtual private network (VPN) system, which can deploy virtual resources (services) at an application level, wherein the application level content can be routed cross a communication network (i.e., the Internet) without disclosing the local network topologies of the resource (service) and the client (requestor), and more particularly a system and method for virtual private network application level content routing using a Dynamic VPN (DVPN) dual-proxy method.

BACKGROUND

One of the most utilized networks for interconnecting distributed computer systems is the Internet. The Internet allows users of computer systems to exchange data throughout the world. In addition, many private networks in the form of corporate or commercial networks are connected to the Internet. These private networks are typically referred to as an "intranet." To facilitate data exchange, the intranet generally uses the same communications protocols as the Internet. These Internet protocols (IP) dictate how data is formatted and communicated. In addition, access to corporate networks or intranets can be controlled by network gateways, which can include a firewall system.

As the popularity of the Internet grew, businesses turned to it as a means of extending their own networks. First came the intranet, which was an access-controlled site designed for use only by company employees. Now, many companies are creating their own VPN (virtual private network) to accommodate the needs of remote employees and distant offices. The VPN is generally a private network that uses a public network (usually the Internet) to connect remote sites or users together. Instead of using a dedicated, real-world connection such as a leased line, a VPN uses "virtual" connections routed through the Internet from the company's private network to the remote site or employee.

In a typical configuration, a local network uses one of the designated "private" IP address subnets (such as 192.168.x.x, 10.x.x.x or 172.16.x.x-172.31.x.x), and a router on that network has a private address (such as 192.168.0.1) in that address space. The router is also connected to the Internet with a single "public" address or multiple "public" addresses assigned by an ISP. As traffic passes from the local network to the Internet, the source address in each packet is translated on the fly from the private addresses to the public address(es). The router tracks basic data about each active connection (particularly the destination address and port). When a reply returns to the router, it uses the connection tracking data it stored during the outbound phase to determine where on the internal network to forward the reply.

The typical virtual private network gateway or device includes a secure communications over an open and typically insecure network such as the Internet. In order to establish secure communication between any two nodes on a virtual private network (VPN), each node obtains by some means information ("configuration") including but not limited to: the identity and state of the remote nodes within the VPN, the relationships between nodes (VPN topology), and cryptography for authentication and data communications encryption between nodes. The secured communication between the two nodes is commonly called a "tunnel", while the nodes themselves are often referred to as "tunnel terminators." The traditional VPN solutions are comprised of a number of tunnel termination devices, which provide a central "hub" for VPN communication. Software is then deployed to nodes that wish to participate in a VPN, and the software is configured manually with the address of the VPN device(s), which is then executed in order to participate in the VPN. The traditional VPN solution exposes the internal network topologies of the two end VPN nodes. The client (requestor) and the resource (service) communicate with each other using their local IP addresses on their own VPN nodes respectively.

Accordingly, it would be desirable to have an application to application system, which can deploy any virtual resources (services) and those application level content can be routed through a virtual private network tunnel without disclosing local internal network topology.

SUMMARY OF THE INVENTION

In accordance with one embodiment, a method of application level content routing using a Dynamic VPN (DVPN) dual-proxy mechanism comprises: providing at least one client on a first virtual private network node a list of available resources hosted on a second virtual private network node; initiating a request by the at least one client for at least one resource from the list of available resources hosted on the second virtual private network node as though the at least one resource is local to the at least one client without exposing an actual IP addresses of the list of available resources on the second virtual private network node; routing the request to the at least one resource through a secure connection (tunnel) between the first virtual private network node and the second virtual private network node; responding to the request by the at least one resource on the second virtual private network node as though the request is initiated locally on the second virtual private network node without exposing an actual IP address of the at least one client on the first virtual private network node; and routing the response from the second virtual private network node back to the at least one client on the first virtual private network node through the secure connection.

BRIEF DESCRIPTION OF THE DRAWINGS

The invention will now be described in greater detail with reference to the preferred embodiments illustrated in the accompanying drawings, in which like elements bear like reference numbers, and wherein.

DETAILED DESCRIPTION

It can be appreciated that today, many industries and enterprises are looking to simplify and optimize their business operations by increasing employee productivity and business agility while streamlining network management and delivering dramatic cost savings. In order to provide a secure, on-demand access both internally and remotely, virtual private network (VPN) devices (aka gateways) can connect employees with remote applications and information (i.e., resources/services) need to meet the demands of customers, from small, local businesses to large, global enterprises and from financial services and healthcare to government and education. For example, secure access to applications and web-enabled content can be utilized by almost all types of businesses from delivering fast, secure access to administrative and clinical applications and patient records in the healthcare industry, improving customer serving service and services while reducing costs for a financial institution, generating optimum productivity from supply chains and employees for retailers, enabling fast, secure access to administrative-and educational applications; providing fast access and iron-clad security for vital operations and data for governmental entities; and the ability to offer fast and secure access and e-mail services, optimum availability and security with streamlined management over the internet.

Web-enabled applications help integrate company systems so they share information and connect employees, suppliers, and administrators to automated business processes. Regardless whether the Internet is being used for financial, supply chain, customer relationship management, or other business critical applications, the essential requirements remain the same: without the appropriate level of performance, availability, and security, applications cannot deliver on promised returns. Moreover, as client and client devices demand greater access to data and services via Web-based or enabled programs, the need for performance, availability, and security enhancing products and solutions has never been greater.

Figure 1:
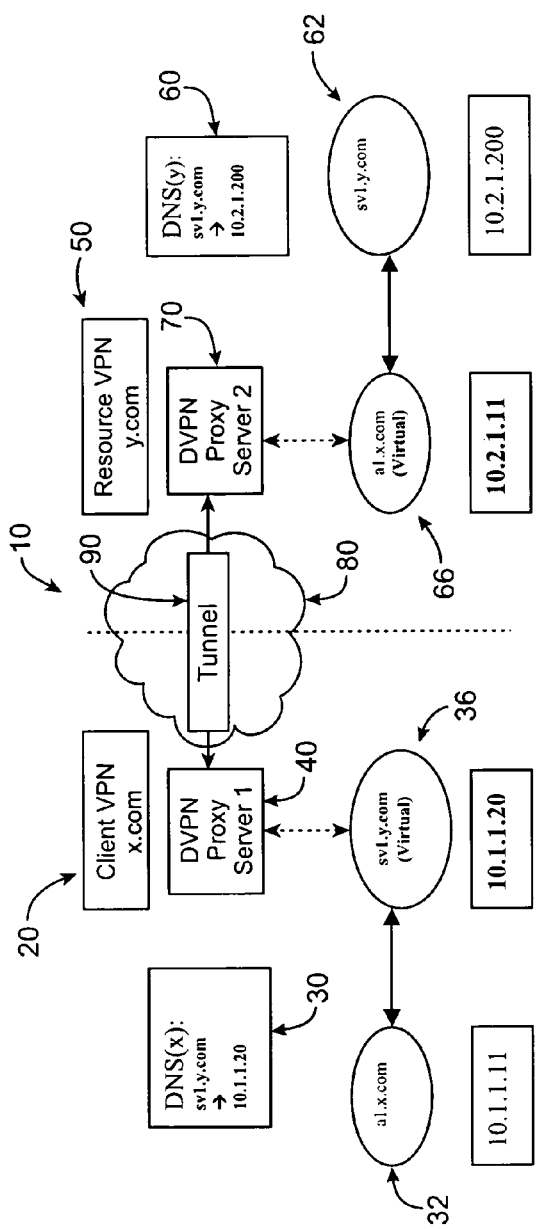
FIG. 1 shows a schematic diagram of a Dynamic Virtual Private Network (DVPN) system using dual proxy method for application level content routing between two peer VPN nodes within a virtual private network system in accordance with one embodiment.

FIG. 1 shows a schematic diagram of a dynamic virtual private network (DVPN) system 10 using dual-proxy method for application level content routing according to one embodiment. As shown in FIG. 1, the system 10 comprises a first virtual private network node (the client VPN node) x.com 20 having at least one client or client machine a1.x.com 32, such as a computer, and a dynamic virtual private network (DVPN) proxy server 40 associated with the first VPN node 20, and a second virtual private network node (the resource VPN node) y.com 50 having at least one resource sv1.y.com 62, and a second dynamic virtual private network (DVPN) proxy server 70 associated with the second VPN node 50. The first and the second DVPN proxy servers 40, 70 work together to deploy any resource for a client to remote access without disclosing the local internal network topologies of the first and the second VPN nodes 20, 50. The first and second virtual private network nodes 20, 50 are preferably configured to securely communicate with one another, using a virtual private network gateway on each end (not shown in FIG. 1), via a communication network 80 (i.e., the Internet). Further, it can be appreciated that the client VPN node can be configured to host at least one resource, such that the resource VPN node can also be a client node, and the client node can be utilized as a resource node.

It can be appreciated that the exchange of data between the first and second nodes 20, 50 of the network system 10 (FIG. 1), can be between a client or client machine 32 such as a computing device (e.g., a computer, PDA, cell phone, any devices with an embedded CPU/software) and/or an application running on a computing device, and a set of resources (files, services, devices, etc.), which can be identified with an individual name and/or IP address. Each of the nodes 20, 50 preferably include information of a sensitive nature containing, for instance, confidential data on finances, business development plans, or private e-mail.

In accordance with one embodiment, the system 10 can include a system and method for virtual private network (VPN) application level content routing. As shown in FIG. 1, the first and second DVPN (dynamic virtual private network) proxy servers 40, 70 are configured such that applications and other related resources such as e-mail on one VPN node 20, 50 are accessible by the other VPN node 20, 50 in a such a manner that the resources are secure, without disclosing the local network topologies of two VPN nodes, as they are transported or accessed by providing for application level content routing and by providing a method and system for a dynamic virtual private network tunnel management. The first and second VPN nodes 20, 50 each include at least one DVPN proxy server 40, 70 respectively, which can be hosted on the virtual private network gateways (not shown in FIG. 1) or on dedicated servers. The DVPN proxy server allows the client or a client device a1.x.com 32 to make requests and connect to resources on other VPN node, such as resource sv1.y.com 62 on node 50, and receive responses back without knowing the specific IP address and/or network topology of the second VPN node 50. In use, the client or client device a1.x.com 32 requests a file, or other resource available on a remote VPN node y.com 50. The first DVPN proxy server 40 on the first VPN node 20, acting as a virtual resource sv1.y.com 36, will receive the request, and route the request to the remote resource on the second VPN node 50 via the second DVPN proxy server 70, acting as a virtual client a1.x.com 66 on the second VPN node 50. The response follows the reverse path. It can be appreciated that in some cases, the DVPN proxy server may alter the contents of the client's request or the server's response for various purposes, such as supporting Microsoft exchange protocol MAPI and Windows file sharing protocol CIFS which embeds IP addresses and port numbers in their contents.

As shown in FIG. 1, a tunnel 90 is established, over a communication network 80 such as Internet, between the first VPN node 20 and the second VPN node 50 using a tunneling protocol, which encapsulates one protocol or session inside another. The tunneling protocol preferably includes a suitable protocol, wherein the transmission of data intended for use only within a private, usually corporate network through a public network in such a way that the routing nodes in the public network are unaware that the transmission is part of a private network. It can be appreciated that the tunneling is preferably performed by encapsulating the private network data and protocol information within the public network transmission units so that the private network protocol information appears to the public network as data.

It can be appreciated that in accordance with one embodiment, each of the VPN node such as node 20, includes a listing of virtual resources such as sv1.y.com 62 on the other VPN node 50 within the network system 10. The listing of available resources 62 can be exchanged between nodes 20, 50 using any suitable method of publication (i.e., resource provisioning). For example, the publication of available resources sv1.y.com 62 can include a manual importation (or provision) of resources 62 by a node or network administrator and/or dynamically provisioning of resources, wherein the establishment of the tunnel between the first and second VPN nodes 20, 50 provides for the exportation of a listing of available resources 62 hosted at the second VPN node 50, such that the at least one resource 62 can be provisioned for accessing by the clients associated with the first VPN node 20. After the proper resource provisioning, the first DVPN proxy server 40 interacts with the client 32, on behalf of the remote resource 62, as though the remote resource 62 as a (virtual) resource 36 with a local IP address 10.1.1.20 on the first VPN node 20. The process can also be applied to provision resources from the VPN node 20 to the VPN node 50.

In accordance with one embodiment, the tunnel 90 is formed using a secure protocol, such as SSL (secure sockets layer) or TLS (transport layer security), which provide secure communications on the Internet for such things as e-mail, Internet faxing, and other data transfers. SSL provides endpoint authentication and communications privacy over the Internet using cryptography. In typical use, only the server is authenticated (i.e. its identity is ensured) while the client remains unauthenticated; mutual authentication requires public key infrastructure (PKI) deployment to clients.

As shown in FIG. 1, the first VPN node 20 has a domain name of x.com and the second VPN node 50 has a domain name of y.com. Each of the VPN nodes 20, 50 includes at least one resource such as sv1.y.com 62, which can be accessed via a resource name such as sv1.y.com. In order to remote access a resource sv1.y.com 62, on the second VPN node 50 having the domain name y.com, the client a1.x.com 32, associated with the first VPN node 20 initiates a requests to access a resource 62 via the first DVPN proxy server 40 on the first VPN node 20 to establish a preferably secure connection or tunnel 90 over a communication network 80 between the first VPN node 20 and the second VPN node 50. The resource 62 on the second VPN node 50 has a resource name sv1.y.com with a unique numeric IP address (e.g., 10.2.1.200 on the second VPN node). After proper provisioning, the remote resource 62 has a local IP address 10.1.1.20 as a (virtual) resource 36 on the first VPN node 20. When the client a1.x.com 32 within the first VPN node 20 requests to access the remote resource sv1.y.com 62, hosted in the second VPN node 50, the resource name sv1.y.com is converted to a local IP address, 10.1.1.20, through the first domain name server (DNS) 30 on the first VPN node 20. Then, the first DVPN proxy server 40, acting as the virtual remote resource 36, will receive the request on the first VPN node 20. The first DVPN proxy server 40, on the first VPN node 20, will tunnel the request through a secure connection 90 to the second DVPN proxy server 70, on the second VPN node 50. The second DVPN proxy server 70, acting as a virtual client a1.x.com 66 sends the request with a local source IP address 10.2.1.11 (for the virtual client a1.x.com 66) and a local destination IP address 10.2.1.200 of the resource sv1.y.com 62 on the second VPN node 50. The response follows the reverse path/process. The first and the second DVPN proxy server work together to receive the request with a pair of source and destination IP addresses within the first VPN node 20, tunnel it through a secure connection 90 to the second VPN node 50, and then sends the request with a pair of source and destination IP addresses within the second VPN node 50. This allows the first DVPN proxy server 40 interacts with the client 32, on behalf of the remote resource 62, using local IP addresses on the first VPN node 20 and the second DVPN proxy server 70 interacts with the resource 62, on behalf of the (remote) client 32, using local IP addresses on the second VPN node 50. Also, this allows the request to be tunneled to the second VPN node 50 without the data packet having to access or traverse a DNS (domain name server) or content router on the Internet 80 during transmission.

It can be appreciated that in order to maintain network opacity for security, it is preferably that only the minimum data needed for remote accessing the available resources or applications will be exchanged. For example, for remote accessing a resource within a server within the second VPN node 50, only the resource name is needed. However, it can be appreciated that an application port number and/or a unique identifier may also be needed. It can be appreciated that other suitable protocol or rules to allow the DVPN proxy server to request and obtain a local IP address, for the remote resource, from the first virtual private network node 20, can apply. Each time a request from the first VPN node 20 to retrieve a resource on or from y.com, the DNS 30 on the first VPN node 20 resolves the resource name to a local IP address such that the request can be received by the first DVPN proxy server 40, acting as a virtual resource 36, which will proxy the traffic over the tunnel 90 to the second VPN node 50. It can be appreciated that each of the DVPN proxy servers will also preferably include information identifying the unique client machine from which the traffic originated. In accordance with one embodiment, a dynamic session identifier can be created each time a new VPN Session Tunnel is established. The dynamic session identifier or session id preferably is a unique hash value based on the source and destination names and/or IP addresses or any suitable method.

As show in FIG. 1, the first VPN node 20 has a first Domain Name Server (DNS) 30 configured to resolve the remote resource name sv1.y.com to a local IP address 10.1.1.20. The first VPN node 20 preferably includes a dynamic host configuration protocol (DHCP) server (not shown in FIG. 1) for assigning a local IP address such as 10.1.1.20 to sv1.y.com at resource provision step. An IP pool or static IP assignment can also be used for this purpose, which allows the remote resource 62, on the second VPN node 50, to be accessed as a virtual local resource 36, on the first VPN node 20, without exposing the second VPN node's network topology and/or IP addresses. The ability of the first and second VPN nodes 40, 70 to convert any request to access a resource within the other VPN node provides added security, wherein the request is tunneled to the other VPN node without having to access a content router or content routing agent within the communication network 80.

In addition, it can be appreciated that the IP address will also include a port number, wherein the port number is preferably in the form of a TCP and UDP protocols. The port number, which can be present in the header of a data packet, can be used to map data to a particular process running on a client or client machine and an application specific process on a resource (server). For example, if the mail proxy server is used for sending and receiving e-mail within the first and the second VPN node both will include a simple mail transfer protocol (SMTP) and a post office protocol version 3 (POP3) service, wherein these will be handled by different server processes, and the port number can be used to determine which data is associated with which process.

Figure 2:
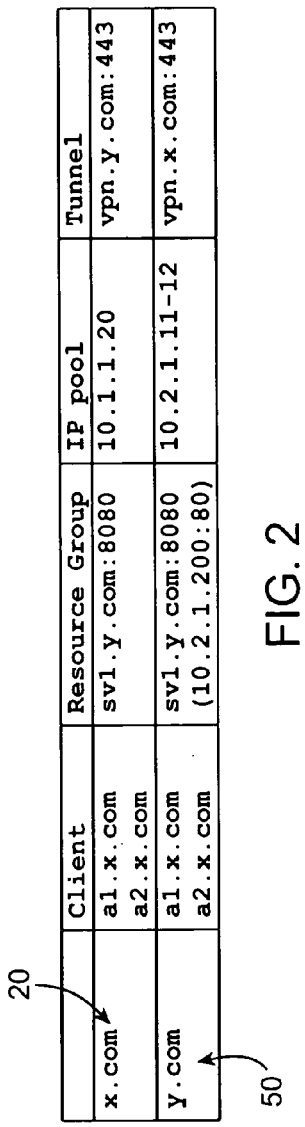
FIG. 2 shows a chart relating to an informational setup of a remote resource deployment between two VPN nodes of a virtual private network system.

FIG. 2 shows a chart of the setup information of a remote resource deployment between two VPN nodes, including various Client Group and Resource Group for each. As shown in FIG. 2, the first VPN node 20 includes a Client Groups (a1.x.com and a2.x.com), a Resource Group sv1.y.com:8080 which is a remote resource associated with the second VPN node 50, a local IP address pool 10.1.1.20 which can be assigned to (Virtual) resource sv1.y.com (FIG. 1, 36) and a tunnel identifier (vpn.y.com:443) to securely communicate with the second VPN node 50. The second VPN node 50 includes a (Virtual) Client Group (a1.x.com and a2.x.com), a Resource Group (sv1.y.com:8080) and its local IP address 10.2.1.200:80 within the second VPN node 50, a local IP address pool 10.2.1.11-12, which can be assigned to virtual clients, a1.x.com and a2.x.com (FIG. 1, 66), and a tunnel identifier (vpn.x.com:443) to securely communicate with the first VPN node 20. The first and second virtual private network nodes 20, 50 preferably communicate with one another via a communication network 80 (i.e., the Internet) or other suitable secure network connection. On the first VPN node 20, the client names, a1.x.com and a2.x.com, can be obtained from their local IP addresses through a reverse DNS lookup by the first DVPN proxy server. On the second VPN node 50, the resource can be identified by a pre-assigned name such as sv1.y.com or a local IP address. In the latter case, the second DVPN proxy server will assign an arbitrary but unique name for the resource for internal usage between the first and the second DVPN proxy servers 40, 70.

Figures 3, 4:
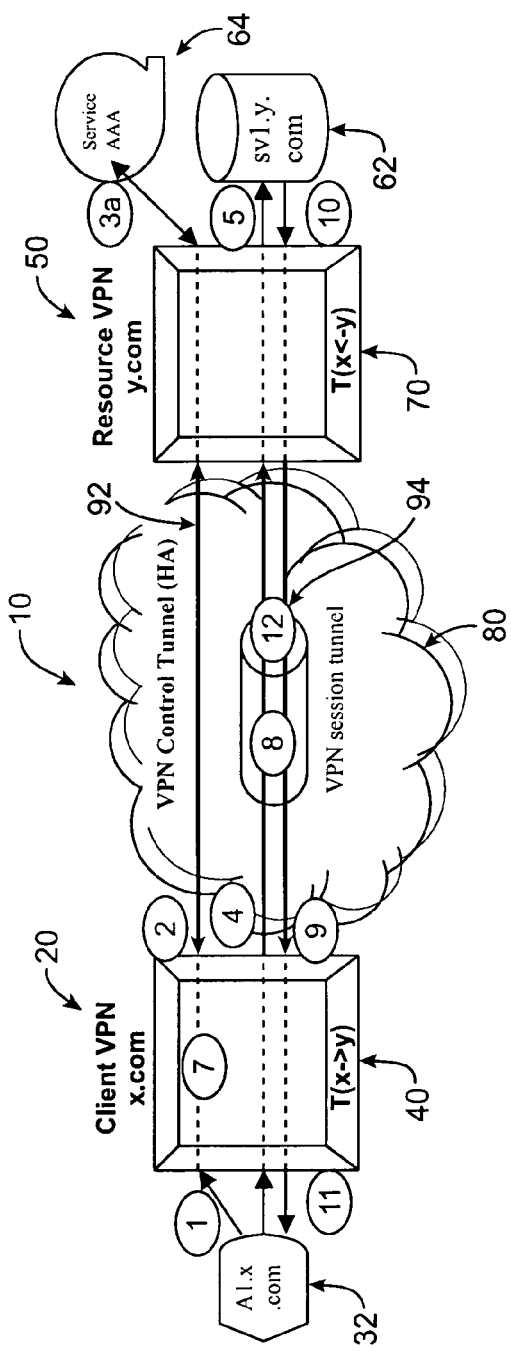
FIG. 3 shows a schematic diagram of a DVPN architecture for remote resource access between two peer VPN nodes.
FIG. 4 shows a chart relating to an informational setup of a remote resource service deployment between two peer VPN nodes in accordance with one embodiment.

FIG. 3 shows a schematic diagram of a DVPN (dynamic virtual private network) system 10 between two VPN nodes 20, 50 for remote resource access. As shown in FIG. 3, the system 10 includes a first VPN node 20 having a first DVPN proxy server T(x->y)40 and a second VPN node 50 having a second DVPN proxy server T(x<-y)70. In accordance with one embodiment, the first DVPN proxy server acting as a virtual (remote) resource sv1.y.com (FIG. 1, 36) of the second VPN node 50 for the client (e.g., a1.x.com 32) on the first VPN node 20 and the second DVPN proxy server acting as a virtual client (FIG. 1, 66) of the first VPN node 20 for the resource (e.g., sv1.y.com 62) on the second VPN node 50. The system 10 as shown in FIG. 3 can provide controlled access to a plurality of resources, which are hosted by the second VPN node 50. The plurality of resources can be securely accessed by a plurality of clients within the first VPN node 20, wherein the plurality of clients are transparent to the others outside of the network and other clients, which have access to the plurality of resources.

Although, the system 10 as shown in FIG. 3 is configured for one client to access, from the first VPN node 20, the client node, to the second VPN node 50, the resource node, it can be appreciated that the client nodes can be configured to host at least one resource or application, such that the resource node can also be a client node, and the client node can be utilized as a resource node. In addition, it can be appreciated that the system 10 can provide application level content routing on demand, which can enable remote resources accesses such as remote printing, file servers and e-mail relay and forwarding, which is secure and transparent to the Internet 90. In addition, the system 10 can be implemented without changing the existing network topologies of the client and resource nodes.

In accordance with one embodiment, each of the VPN nodes 20, 50 preferably contain resources, which can remotely be accessed from the other VPN node in a transparent manner without requiring either administrator knowing the topology of the other's network. The listing of resources can be made available through a publishing/provisioning mechanism on a node-by-node basis or other suitable method. The first and the second DVPN proxy servers 40, 70 maintain a high availability (HA) VPN Control Tunnel 92, over a communication network 80, for exchanging VPN Session Tunnel requests. Upon requesting from a client a1.x.com 32 associated with the first VPN node 20 for a resource sv1.y.com 62 within the second VPN node 50, acting as a (virtual) resource of sv1.y.com 62, the first DVPN proxy server 40 on the first VPN node 20 receives the request and initiates a session request via the VPN Control Tunnel 92 to the second DVPN proxy server 70 to establish a VPN Session Tunnel 94 for connection with the resource, sv1.y.com 62, available on the second VPN node 50. The first DVPN proxy server 40 on the first VPN node 20 using a local IP address receives the request, and routes the request via a VPN Control Tunnel 92 to the second DVPN proxy server 70 on the second virtual private network node 50. The second proxy server 70 issues the request, on behalf of the client a1.x.com 32, to the resource sv1.y.com 62 using a local IP address on the second VPN node 50. The translation of the client name a1.x.com and the resource name sv1.y.com to local IP addresses is preferably performed by domain name servers 30 and 60 (FIG. 1) within the first and the second VPN nodes 20, 50.

As part of the initial hand-shaking between the first and the second DVPN proxy servers of the two connecting VPN nodes 20, 50, the request to access the resource sv1.y.com 62 from a client a1.x.com 32 is optionally checked via an authentication and authorization module or a service within the VPN device or gateway (not shown) to the authentication and authorization (AAA) server 64. The authentication and authorization (AAA) server 64 will check: who you are (authentication); what you are allowed to do (authorization); and what you are actually doing (accounting/auditing). It can be appreciated that accounting information can be used in tracking client use for security auditing, billing or reporting purposes. Upon passing AAA checking, a VPN Session Tunnel 94 is established between the two DVPN proxy servers 40, 70 for further data traffic between the client a1.x.com 32 and the resource sv1.y.com 62.

After the client a1.x.com 32 has established a secure connection (via VPN Session Tunnel 92) with the remote resource sv1.y.com 62, the client can do a number of network based application to application communication such as, but not limited to, file manipulation operations of uploading files to the resource 62, download files from the resource 62, rename or delete files on the resource 62, or other suitable actions. The requested operation from the client 32 is received by the first DVPN proxy server 40 (acting as a virtual resource of sv1.y.com 62) on the first VPN node 20, which forwards the request via the VPN Session Tunnel 94 established between the first and the second DVPN proxy servers on the first and second virtual private network node 20, 50. The second DVPN proxy server receives the requested operation, via the VPN Session Tunnel 94, and then issues the requested operation (acting as a virtual client of a1.x.com 32) to the resource 62, upon which the desired operation is performed. The resource 62 responds by transmitting a packet (i.e., formatted block of data) to the client 32 via the second DVPN proxy server on the second VPN node 50 and the established VPN Session Tunnel 94. The response is received by the first DVPN proxy server 40 on the first virtual private network node 20, which forwards the response to the client 32.

FIG. 4 shows a chart relating to the informational setup of a remote resource deployment, using file transfer protocol (ftp) as an example, between two nodes in accordance with the embodiment as shown in FIG. 3. It can be appreciated that a request for a remote resource access such as file transfer or data exchange can be pursuant to a file transfer protocol or any other suitable protocols. As shown in FIG. 4, the first VPN node 20 can include Client Group, a1.x.com and a2.x.com, having a (virtual) Resource Group sv1.y.com:2121, a local IP address 10.1.1.20 which can be assigned to the (virtual) resource sv1.y.com:2121 and a secure tunnel identifier (vpn.y.com:443) with the second VPN node 50. The second VPN node 50 can also include (virtual) Client Group, a1.x.com and a2.x.com, a real resource sv1.y.com:2121 and its local IP address 10.2.1.200:21, a local IP address pool (10.2.1.11-12) which can be assigned to the virtual Client Group (a1.x.com and a2.x.com), and a secure tunnel identifier (vpn.x.com:443) with the first VPN node 20. The first and second VPN nodes 20, 50 communicate with one another via a communication network 80 (i.e., the Internet). On the first private VPN node 20, the names of Client Group (a1.x.com and a2.x.com) can be identified from their local IP addresses through reverse DNS lookup by the first DVPN proxy server. On the second VPN node 50, the resource can be identified by a pre-assigned name such as sv1.y.com or a local IP address. In the latter case, the second DVPN proxy server can assign an arbitrary but unique name for the resource for usage between the first and the second DVPN proxy servers.

Figure 5:
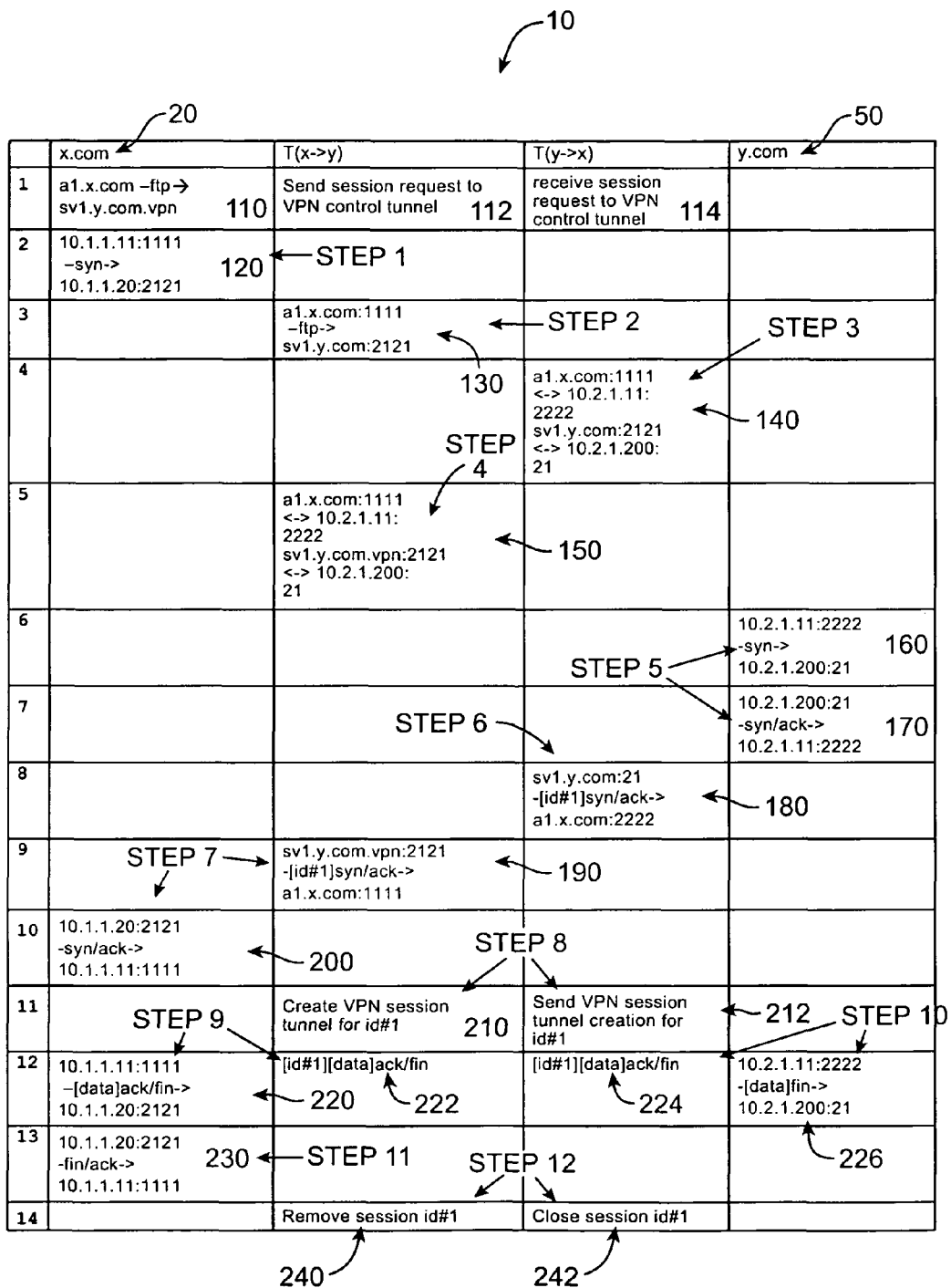
FIG. 5 shows a table relating the remote resource (ftp) access packet flow between two peer VPN nodes in accordance with one embodiment.

FIG. 5 shows a table relating to hand-shaking and data packet flow between two DVPN proxy servers to serve a client's ftp request to a remote resource in accordance with the embodiment as shown in FIGS. 3 and 4. The system 10 includes a client a1.x.com (FIG. 3, 32) on the first VPN node x.com 20 accessing a remote resource (ftp server) sv1.y.com (FIG. 3, 62) on the second VPN node y.com 50. As shown in FIG. 5 row 1, the hand-shaking is started between the first and the second DVPN proxy servers when the client initiates a request to access an ftp server: a1.x.com-ftp->sv1.y.com 110. The first DVPN proxy server T(x->y), on the first VPN node x.com 20, sends a session request 112 to the VPN Control Tunnel (FIG. 3, 92) which is received 114 by the second DVPN proxy server T(x<-y), on the second VPN node 50.

In accordance with one embodiment, a transfer of files or data on an application level can be performed using an application level content routing system as shown in FIGS. 3-5. The hand-shaking and data packet flow in FIG. 5 is explained by the step sequence in FIG. 3. FIG. 4 shows the setup information for mapping the client and the resource names, IP addresses and port numbers between the first and the second DVPN proxy servers.

Step 1: The client a1.x.com (FIG. 3, 32) sends a TCP sync packet 10.1.1.11:1111-syn->10.1.1.20:2121 (FIG. 5, 120) requesting (remote) access to sv1.y.com on y.com 50. The source IP address 10.1.1.11 is the local IP address with port number 1111 of the client a1.x.com on the first VPN node 20. The destination IP address 10.1.1.20 is the local IP address with port number 2121 of the remote resource sv1.y.com on the first node x.com 20.

Step 2: On behalf of the remote resource, the first proxy server T(x->y) receives the request and sends a1.x.com:1111-ftp->sv1.y.com:2121 (FIG. 5, 130) to the second proxy server T(x<-y) via the VPN Control Tunnel (FIG. 3, 92). FIG. 4 shows the mapping information from the remote resource local IP address 10.1.1.20 on the first VPN node 20 to the remote resource name sv1.y.com:2121.

Step 3: Upon receiving the request, the second proxy server T(x<-y) assigns a local IP address and port number 10.2.1.11:2222 to a1.x.com:1111 (per setup table on FIG. 4) on the second VPN node 50 and sends this information with the local IP address 10.2.1.200:21 of the resource sv1.y.com:2121 (FIG. 5, 140) back to the first proxy server T(x→y) via the VPN Control Tunnel 92. The client has port number 1111 on the first node x.com 20 and port number 2222 on the second node y.com 50. The resource has port number 2121 on the first node x.com 20 and port number 21 on the second node y.com 50. The resource name and IP address mapping can be performed through a local DNS lookup, static IP assignment, and any other appropriate method.

Step 3a: Optionally, the second proxy server T(x<-y) performs AAA checking to authenticate and authorize the access request.

Step 4: The first proxy server T(x->y) receives a1.x.com:1111<->10.2.1.11:2222 sv1.y.com:2121<->10.2.1.200:21 (FIG. 5, 150) which contains the client and the resource names and their local IP addresses and port numbers on the second node y.com 50. It can be appreciated that local IP addresses and port numbers, on the second virtual private network node 50, can be used to uniquely identify this request. However, any other suitable method can also be used.

Step 5: Acting as a virtual client a1.x.com on the first node x.com 20, the second proxy server T(x<-y) sends a TCP syn packet (10.2.1.11:2222-syn->10.2.1.200:21, FIG. 5, 160) to the resource sv1.y.com. The source IP address 10.2.1.11:2222 is a local IP address and port number for the client a1.x.com on the second node y.com 50. The destination IP address 10.2.1.200:21 is the local IP address and port number of the resource sv1.y.com on the second node z.com 50. The resource (ftp server) sv1.y.com responds back with a TCP syn/ack packet (10.2.1.200:21-syn/ack->10.2.1.11:2222, FIG. 5, 170).

Step 6: Upon receiving the TCP syn/ack packet (FIG. 5, 770), the second proxy server T(x<-y) sends sv1.y.com:21-[id#1]syn/ack->a1.x.com:2222 (FIG. 5, 180) to the first proxy server T(x->y) via the VPN Control Tunnel 92 in FIG. 3 notifying that the resource sv1.y.com on the second node 50 is available and ready for the client a1.x.com on the first node 20 to access. The second proxy server generates a unique identifier id#1 for the VPN Session Tunnel 94 (FIG. 3), using a hashing function based on the client name and the resource name and/or any suitable method which can uniquely be re-generated by either of theses two proxy servers. The unique identifier id#1 will be used by these two proxy servers to identify data traffic exchanged through the VPN Session Tunnel 94 between the client a1.x.com 32 and the server sv1.y.com 62.

Step 7: Upon receiving the notification, the first proxy server maps the sv1.y.com:21 to sv1.y.com:2121 and a1.x.com:2222 to a1.x.com:1111 (FIG. 5, 190). Port numbers 2121 and 1111 are local port numbers for the resource sv1.y.com and the client a1.x.com on the first node x.com 20. This mapping is based on information exchanged in Step 2, 3, and 4 (FIG. 5, 130, 140, 150 respectively). Then, the first proxy server T(x->y), on behalf of the (remote) resource sv1.y.com, sends a TCP syn/ack packet, 10.1.1.20:2121-syn/ack->10.1.1.11:1111 (FIG. 5, 200) to the client a1.x.com.

Step 8: In parallel, the second DVPN proxy server T(x<-y) sends a VPN Session Tunnel 94 creation request for id#1 (FIG. 5, 212) to the first DVPN proxy server T(x->y) via the VPN Control Tunnel 92 (FIG. 3). Then, the first DVPN proxy server T(x->y) creates the VPN Session Tunnel 94 for id#1 (FIG. 5, 210). After the establishment of the VPN Session Tunnel id#1 (FIG. 3, 94), the client a1.x.com and the (remote) resource sv1.y.com can communicate (exchange data) securely as though they are local on the same virtual private network node. The first DVPN proxy server T(x->y) and the second DVPN proxy server T(x<-y) proxy (route) the exchanged data through the VPN Session Tunnel id#1 (FIG. 3 94).

Step 9: Upon completion of the data exchange, the client a1.x.com 32 sends the TCP packet 10.1.1.11:1111-[data]ack/fin->10.1.1.20:2121 (FIG. 5, 220). After receiving the packet on behalf of the (remote) resource sv1.y.com 62 on the second node 50, the first DVPN proxy server T(x->y) sends [id#1][data]ack/fin (FIG. 5, 222) to the second DVPN proxy server T(x<-y) via the VPN Session Tunnel 94.

Step 10: Upon receiving [id#1][data]ack/fin (FIG. 5, 224), the second DVPN proxy server T(x<-y), on behalf of the client a1.x.com 32, sends a TCP packet 10.2.1.11:2222->[data]ack/fin->10.2.1.200:21 (FIG. 5, 226) to the resource sv1.y.com 62 on the second node 50.

Step 11: Upon the completion of the exchange of data, the first DVPN proxy server T(x->y), on behalf of the (remote) resource sv1.y.com 62 on the second VPN node 50, sends a TCP packet 10.1.1.21:2121-fin/ack->10.1.1.11:1111 (FIG. 5, 230) to the client a1.x.com 32 on the first node 20.

Step 12: The first DVPN proxy server T(x->y) sends remove session id#1 (FIG. 5, 240) to the second DVPN proxy server T(x<-y) via the VPN Control Tunnel 92. The second DVPN proxy server T(x<-y)/T(y->z) closes the VPN Session Tunnel 94 associated with id#1 (FIG. 5, 242).

This completes the client a1.x.com 32 access to the (remote) resource sv1.y.com 62.

In accordance with one embodiment, each DVPN proxy server can establish multiple (Child) VPN Session Tunnels 95 from a (Parent) VPN Session Tunnel 94 in order to support those application protocols, such as active mode file transfer protocol (ftp), VoIP/SIP, or any other suitable application protocols, for example, a FTP server can be published or provisioned to a client VPN node, which will require both a control port (port 21) and a data port (port 20). It can be appreciated that once the primary (or parent) VPN Session Tunnel 94 is established for the ftp control port (port 21), a secondary (or child) VPN Session Tunnel 95 is required for the ftp data port (port 20).

Figures 6, 7:
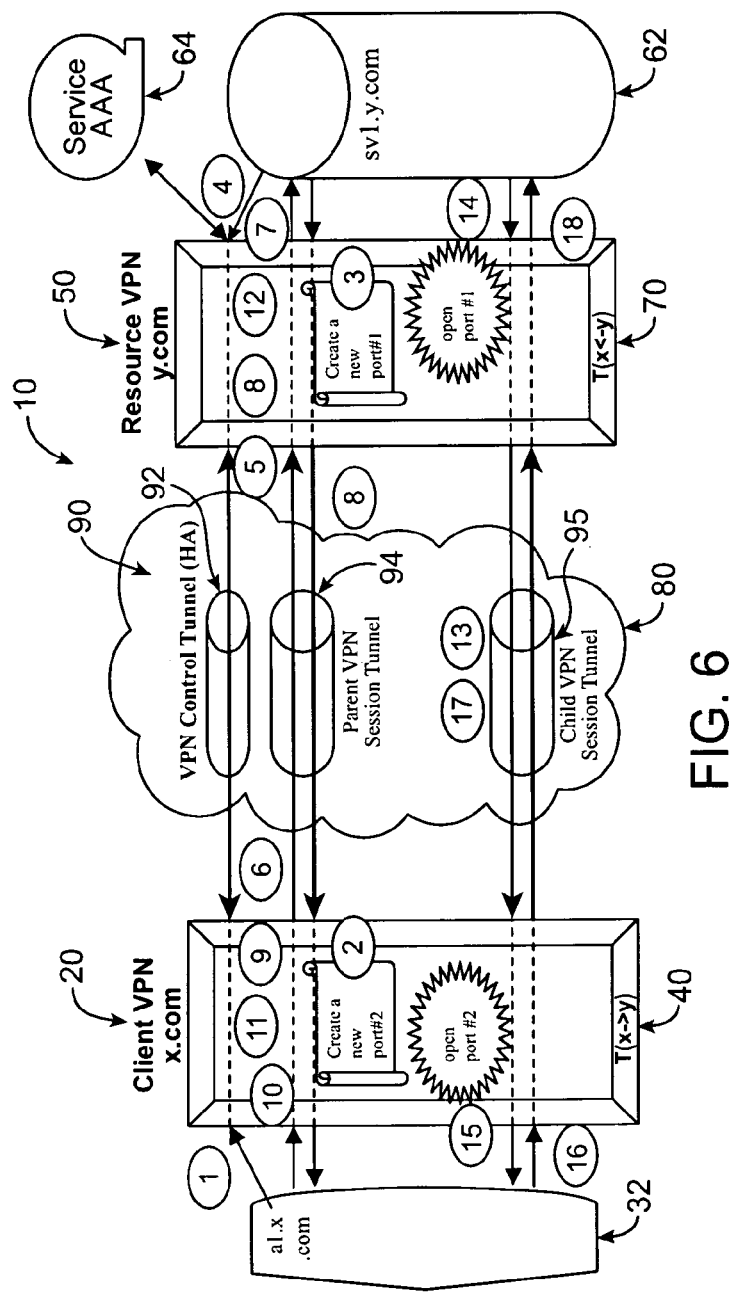
FIG. 6 shows a schematic diagram of a Dynamic VPN (DVPN) architecture between peer VPN nodes having application protocols using multiple (TCP) ports in accordance with one embodiment.
FIG. 7 shows a chart relating to an informational setup of a remote resource service, using multiple (TCP) application ports, deployment between two peer VPN nodes in accordance with the embodiment as shown in FIG. 6.

FIG. 6 shows a schematic diagram of a DVPN architecture system 10 between two VPN nodes 20, 50 having application protocols using multiple (TCP) ports. As show in FIG. 6, the system 10 can be configured wherein each of the VPN node 20, 50 can act as a client node and a resource node by the establishment of a Child VPN Session Tunnel 95 in addition to the Parent VPN Session Tunnel 94. It can be appreciated that the Child VPN Session Tunnel 95 is not limited to only one Child VPN Session Tunnel 95, and based on the establishment of the Parent VPN Session Tunnel 94, a plurality of Child VPN Session Tunnels 95 can be established. It can be appreciated, that the client a1.x.com 32 can access a plurality of resources within the second VPN node 50, each requiring a Parent VPN Session Tunnel 94 and multiple Child VPN Session Tunnels 95.

In accordance with one embodiment, for example, the system 10 can provide an active mode file transfer protocol (ftp), for exchanging files or resources from a client a1.x.com 32 associated with the first VPN node 20 and at least one resource sv1.y.com 62 (ftp server), which is associated with the second VPN node 50. It can be appreciated that the client a1.x.com 32 can request to establish a Child VPN Session Tunnel 95 for an ftp data channel with the ftp server sv1.y.com 62 associated with the second node 50 while using the Parent VPN Session Tunnel 94 as the ftp control channel. It can be appreciated that a resource can also request to establish a Child VPN Session Tunnel 95 such as support passive mode ftp.

As shown in FIG. 6, the first VPN proxy server 40 on the first VPN node 20 receives a request from the client a1.x.com 32 and creates/opens a new port#2, per active ftp protocol. The second DVPN proxy server, on the second VPN node 50, creates/opens a new port#1 and sends the request to the ftp server sv1.y.com 62, per active ftp protocol, on behalf of the client a1.x.com 32 on the first VPN node 20.

FIG. 7 shows a chart relating a setup of a remote active-mode file transfer protocol (ftp) service deployment between two nodes 20, 50 in accordance with the embodiment as shown in FIG. 6. As shown in FIG. 7, the first VPN node 20 can include Client Group a1.x.com and a2.x.com having a Resource Group requiring two TCP ports sv1.y.com:2121 and sv1.y.com:2020, a local IP address 10.1.1.20, which can be assigned to the resource sv1.y.com, and a secure tunnel identifier vpn.y.com:443 with the second VPN node 50. The second VPN node 50 can also include the virtual Client Group a1.x.com and a2.x.com, having one Resource Group requiring two TCP ports sv1.y.com:2121 and sv1.y.com:2020 and their local IP addresses/port numbers 10.2.1.200:21 and 10.2.1.200:20 respectively, a local IP address Pool 10.2.1.11-12 which can be assigned to (virtual) Client Group a1.x.com and a2.x.com, and a secure tunnel identifier (vpn.x.com:443) with the first VPN node 20. The first and second virtual private network nodes 20, 50 communicate with one another via the communication network 80 (i.e., the Internet). On the first VPN node 20, the names of Client Group, a1.x.com and a2.x.com, can be identified from their local IP addresses through reverse DNS lookup by the first DVPN proxy server 40 on the first VPN node 20. On the second VPN node 50, the resource can be identified by a pre-assigned name such as sv1.y.com:2121 or a local IP address. In the latter case, the second DVPN proxy server can be assigned an arbitrary but unique name for the resource for the internal usage between the first and the second DVPN proxy servers.

Figure 8:
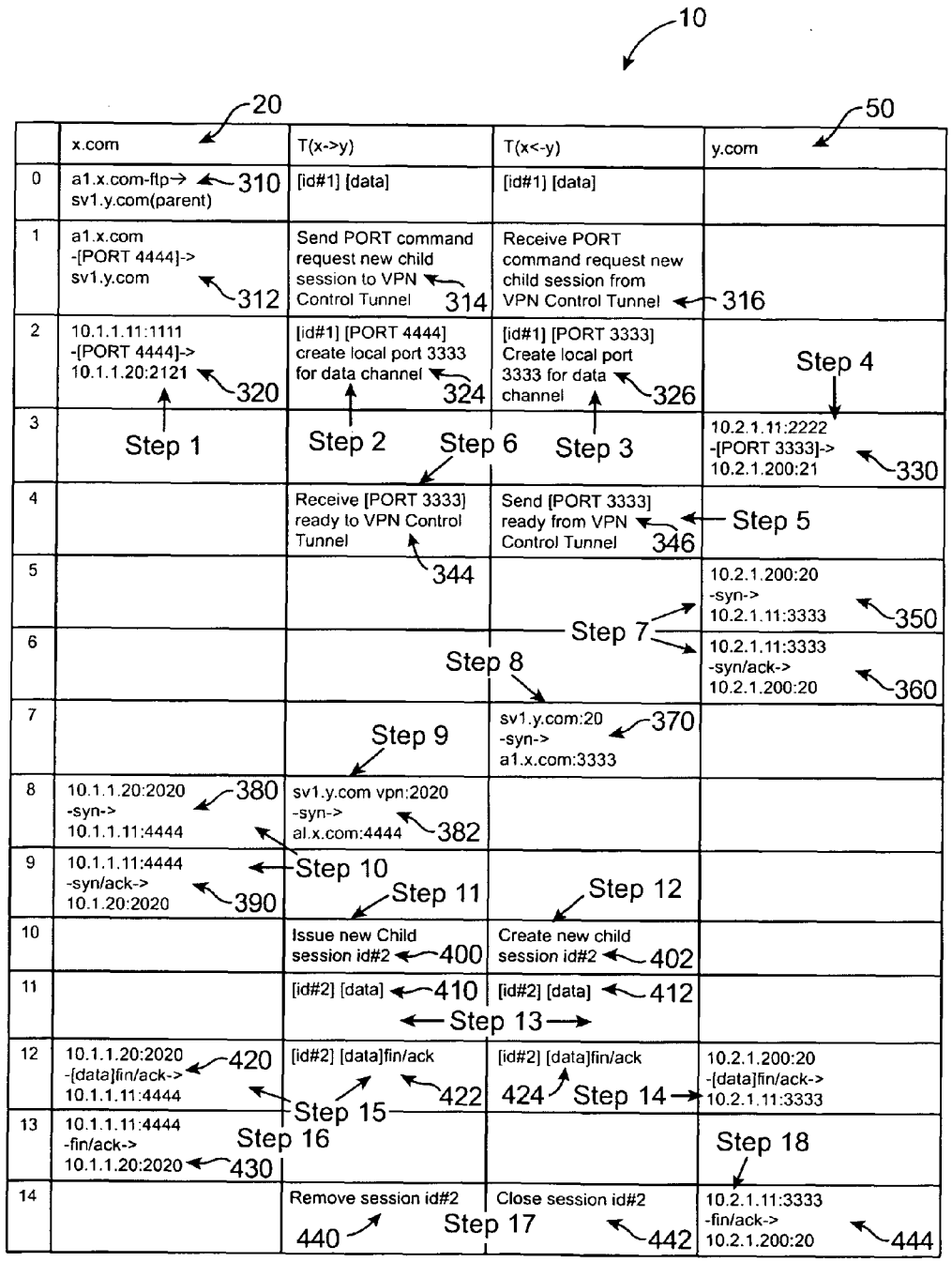
FIG. 8 shows a table relating the packet flow of the remote resource access using multiple (TCP) ports between two peer VPN nodes in accordance with the embodiment as shown in FIGS. 6 and 7.

FIG. 8 shows a chart relating to hand-shaking and data packet flow between two DVPN proxy servers to serve an active mode ftp server requesting to establish a data channel in accordance with one embodiment as shown in FIGS. 6 and 7. The system 10 includes a client a1.x.com on the first node 20 having established a secure (Parent) VPN Session Tunnel 94 with the remote ftp server sv1.y.com on the second VPN node 50. As shown in FIG. 8 row 0, the client a1.x.com is exchanging ftp control traffic with the remote ftp server sv1.y.com via the Parent VPN Session Tunnel 94 established between the first DVPN proxy server T(x->y) and the second DVPN proxy server T(x<-y) on the first and the second VPN nodes 20, 50 as set forth in FIGS. 3-5.

As shown in FIG. 8 row 1, the client a1.x.com 32 on the first VPN node 20 wants to establish a data channel with the ftp server sv1.y.com 62 on the second VPN node 50, a1.x.com-[PORT 4444]->sv1.y.com (312). The port number 4444 of the data channel can be any suitable port number per active-mode ftp protocol. In responding to the request, the first DVPN proxy server T(x->y) sends a PORT command request 314 to create a Child VPN Session Tunnel 95, associated with the Parent VPN Session Tunnel id#1 (FIG. 6, 94), and received by the second DVPN proxy server T(x<-y) 316 via the VPN Control Tunnel 92 in FIG. 6.

The hand-shaking and data packet flow in FIG. 8 is explained by the step sequence in FIG. 6 and setup information in FIG. 7.

Step 1: The client a1.x.com sends an ftp PORT command 10.1.1.11:1111-[PORT 4444]->10.1.1.20:2121 (320). The source IP address and port number 10.1.1.11:1111 is the local IP address and control channel port number of the client a1.x.com 32 on the first VPN node 20. The destination IP address and port number 10.1.1.20:2221 is the local IP address and port number of the (virtual) resource sv1.y.com 62 on the first VPN node 20.

Step 2: In responding to the new PORT 4444 commend associated with the established Parent VPN Session Tunnel id#1 (FIG. 6, 94), the first DVPN proxy server T(x->y) creates a new port number 3333, to be used by the second DVPN proxy server T(x<-y), and sends this information 324 to the second DVPN proxy server T(x<-y) on the second VPN node 50 via the VPN Control Tunnel 92 (FIG. 6). The port number 3333 is an arbitrary, but unique number, which can also be 4444 without any change.

Step 3: The second DVPN proxy server T(x<-y) creates the new port 3333 (326) associated with [id#1][PORT 3333] for the ftp data channel on the second VPN node 50.

Step 4: On behalf of the client a1.x.com 32, the second DVPN proxy server T(x<-y) sends a FTP port command, 10.2.1.11:2222-[PORT 3333]->10.2.1.200:21 (330). The source IP address and port number 10.2.1.11:2222 is the (virtual) client a1.x.com 32 IP address and port number on the second VPN node 50. The destination IP address and port number is 10.2.1.200:21 and the resource sv1.y.com 62 IP address and port number on the second VPN node 50.

Step 5: The second DVPN proxy server T(x<-y) sends [PORT 3333] ready message (346) to the first DVPN proxy server T(x->y) via the VPN Control Tunnel 92 (FIG. 6).

Step 6: The first DVPN proxy server T(x->y) acknowledges each other that [PORT 3333/4444] is ready (344).

Step 7: In parallel, the FTP server issues a TCP syn packet, 10.2.1.200:20-syn->10.2.1.11:3333 (350) to the (virtual) client a1.x.com using its local IP address and port number 10.2.1.11:3333 on the second VPN node 50. On behalf of the (virtual) client, the second DVPN proxy server T(x<-y) responds a syn/ack TCP packet, 10.2.1.11:3333-syn/ack->10.2.1.200:20 (360).

Step 8: The second DVPN proxy server T(x<-y) passes the syn request to the first DVPN proxy server T(x->y), sv1.y.com:20-syn->a1.x.com:3333 (370), via the VPN Control Tunnel 92 (FIG. 6).

Step 9: After receiving the syn request (382), the first DVPN proxy server maps the resource port number 20 to port number 2020 to be used on the first VPN node 20 and the client port number 3333 to 4444 to be used on the first VPN node 20.

Step 10: On behalf of the (remote) ftp server sv1.y.com, the first DVPN proxy server T(x->y) sends 10.1.1.20:2020-syn->10.1.1.11:4444 (380) to the client a1.x.com on the first VPN node 20. The client a1.x.com responds with a TCP syn/ack packet 10.1.1.11:4444-syn/ack->10.1.1.20:2020 (390).

Step 11: The first DVPN proxy server T(x->y) creates a unique identifier, id#2, for the Child VPN Session Tunnel 95 (FIG. 6) and sends it to the second DVPN proxy server T(x<-y) via the Control VPN Tunnel 92. The unique identifier, id#2, preferably uses a hash function based on the ftp server and the client names, IP addresses, and port numbers such that the first proxy server T(x->y) and the second proxy server T(x<-y) can recreate the same hashing result.

Step 12: The second DVPN proxy server T(x<-y) receives the message and creates the (Child) VPN Session Tunnel 95 (FIG. 6) with identifier id#2.

Step 13: After the establishment of the Child VPN Session Tunnel 96 (FIG. 6), the client a1.x.com 32 and the FTP server sv1.y.com 62 exchange data via the Child VPN Session Tunnel 95 (410 and 412) per active-mode ftp protocol.

Step 14: Upon completion of the exchange of date, the ftp server sv1.y.com sends a TCP [data]fin/ack packet to the (virtual) client, 10.2.1.200:20-[data]fin/ack->10.2.1.11:3333 (426). In responding to the packet, the second DVPN proxy server T(x<-y) sends [id#2][data]fin/ack (424) to the first DVPN proxy server T(x->y).

Step 15: The first DVPN proxy server T(x->y) receives [id#2][data]fin/ack (422). Then, on behalf of the (remote) FTP server sv1.y.com, the first DVPN proxy server T(x->y) sends 10.1.1.20:2020-[data]fin/ack->10.1.1.11:4444 (420) to the client a1.x.com.

Step 16: The client responds with a TCP fin/ack packet, 10.1.1.11:4444-fin/ack->10.1.1.20:2020 (430).

Step 17: The first DVPN proxy server T(x->y) and the second DVPN proxy server T(x<-y) removes and closes (440, 442) the Child VPN Tunnel id#2.

Step 18: On behalf of the client a1.x.com, the second DVPN proxy server T(x<-y) sends 10.2.1.11:3333-fin/ack->10.2.1.200:20 (444) to the ftp server sv1.y.com to acknowledge the completion of the file and/or data exchange.

Figures 9, 10:
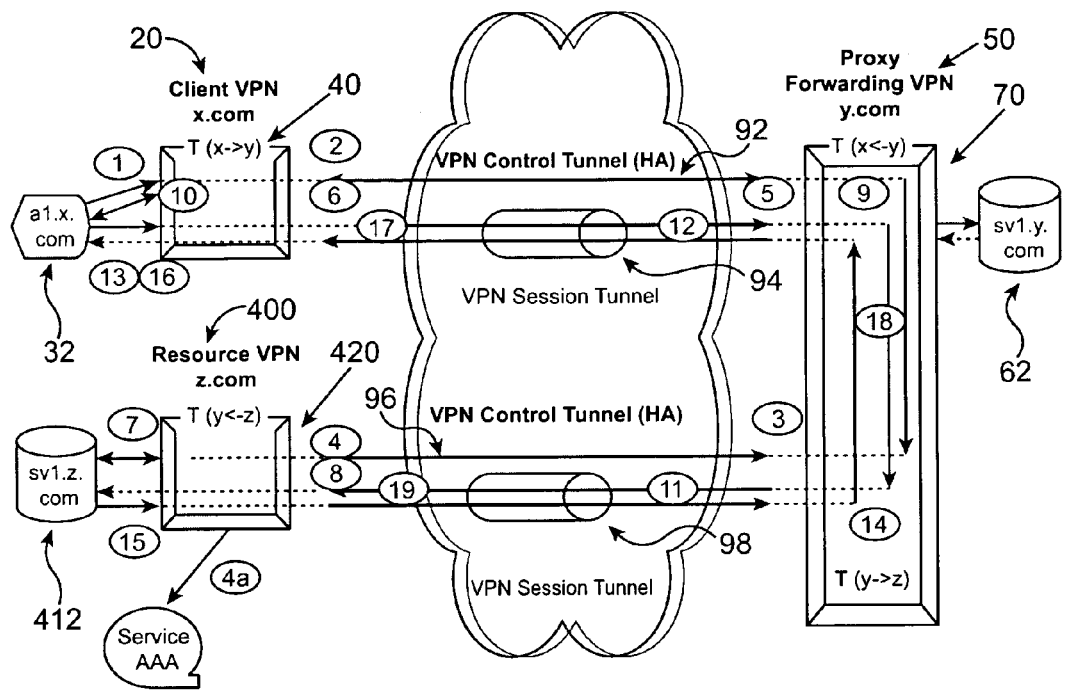
FIG. 9 shows a schematic diagram of a Dynamic VPN (DVPN) architecture between two peer VPN nodes via an intermediate VPN node as proxy forwarding in accordance with one embodiment.
FIG. 10 shows a chart relating to an informational setup of a remote resource access between two peer VPN nodes via an intermediate node in accordance with the embodiment as shown in FIG. 9.

FIG. 9 shows a schematic diagram of a network system 10 having a plurality of virtual private network nodes 20, 50, 400, which can be securely connected to one another via the communication network 80 (i.e., the Internet). As shown in FIG. 9, the system 10 includes a first VPN node x.com 20 having a first DVPN proxy server T(x->y) 40 running on a first VPN gateway (not shown), a second VPN node y.com 50 having a second DVPN proxy server T(x<-y)/T(y->z) 70 running on a second VPN gateway (not shown), and a third VPN node z.com 400 having a third DVPN proxy server T(y<-z) 420 running on a third VPN gateway (not shown). In accordance with one embodiment, a client a1.x.com 32 on the first VPN node x.com 20, can remotely access a resource sv1.z.com 412, on the third VPN node z.com 400, via an intermediate (the second) VPN node y.com 50. The second DVPN proxy server performs proxy forwarding function for all communication traffic between the client a1.x.com 32, and the resource sv1.z.com 412. It can be appreciated that a client can access a remote resource through multiple intermediate DVPN proxy serves on multiple VPN nodes. The first DVPN, proxy server acting as a virtual (remote) resource on the third VPN node z.com 400 for the client a1.x.com 32 on the VPN node x.com 20 and the third DVPN proxy server acting as a virtual client on the first VPN node x.com 20 for the resource sv1.z.com 412 on the third VPN node z.com 400.

The second VPN node y.com 50 can also includes resources such as sv1.y.com 62, which can be accessed by remote clients such as a1.x.com 32. As shown in FIG. 9, the system 10 can also provide controlled access to a plurality of resources, which are hosted by the third VPN node 400. The plurality of resources can be securely accessed by a plurality of clients on the first VPN node 20, wherein the plurality of clients are transparent to the others outside of the network and other clients, which have access to the plurality of resources. In addition, the resources 62, 412 associated with the second or third VPN nodes 50, 400 are also configured to initiate a request to the first node 20 for the access to at least one resource associated therewith 20. In accordance with one embodiment, it can be appreciated that the client 32 can access resources 62, 412 located within different nodes 50, 400 via a secure network connection. In accordance with a further embodiment, it can be appreciated that multiple Child VPN Session Tunnels can be created to support special application protocols, such as active and passive ftp, via the intermediate node 50. In the embodiment as shown in FIG. 9, the second node (y.com) and the third node (z.com) can be configured such that resources 62, 412 associated with the two nodes 50, 400 can only be access via the first node 20 (x.com). It can also be appreciated that the plurality of nodes 20, 50, 400 is not limited to three nodes as shown in FIG. 9, rather the number of nodes 20, 50, 400 is essentially infinite.

FIG. 10 shows a chart relating a setup of proxy forwarding by an intermediate (the second) DVPN proxy server between the first and the third VPN nodes in accordance with the embodiment as shown in FIG. 9. As shown in FIG. 10, the first VPN node x.com 20 can include a client group a1.x.com and a2.x.com, a (virtual) resource group sv1.y.com:2121 and sv1.y.com:2020 exported from the second VPN node y.com, a local IP address (10.1.1.20), which can be assigned to the (virtual) resource sv1.y.com:2121 and sv1.y.com:2020, another (virtual) resource group of sv1.z.com:2121 and sv1.z.com:2020 exported, via the second VPN node 50, from the third VPN node z.com and a local IP address pool (10.1.1.21), which can be assigned to the (virtual) resource sv1.z.com:2121 and sv1.z.com:2020, and a secure tunnel vpn.y.com:443 to the second VPN node y.com 50. The second VPN node 50 can include a (virtual) client group a1.x.com and a2.x.com, a resource group of sv1.y.com:2121 and sv1.y.com:2020 with local IP addresses 10.2.1.200:21 and 10.2.1.200:20, respectively, a local IP address pool (10.2.1.11-12), which can be assigned to the (virtual) client a1.x.com and a2.x.com, a secure tunnel vpn.x.com:443 to the first VPN node 20, and another secure tunnel vpn.z.com:444 to the third VPN node z.com 400. The third VPN node 400 can include a (virtual) client group a1.x.com and a2.x.com, a resource group of sv1.z.com:2121 and sv1.z.com:2020 with their local IP address 10.3.1.200:21 and 10.3.1.200:20, respectively, a local IP address pool (10.3.1.11-12), which can be assigned to the (virtual) client a1.x.com and a2.x.com, and a secure tunnel vpn.y.com:444 to the second VPN node y.com 50. Each secure tunnel, such as vpn.y.com:443, vpn.x.com:443, vpn.z.com:444 and vpn.y.com:444 can include a VPN Control Tunnel (such as 92 and 96 in FIG. 9) and multiple VPN Session Tunnels (such as 94 and 98 in FIG. 9). It can be appreciated that the VPN Control Tunnel can be used by the two DVPN proxy servers at each end to negotiate the creation of a VPN Session Tunnel for data transfer of a particular remote resource access.

Figure 11:
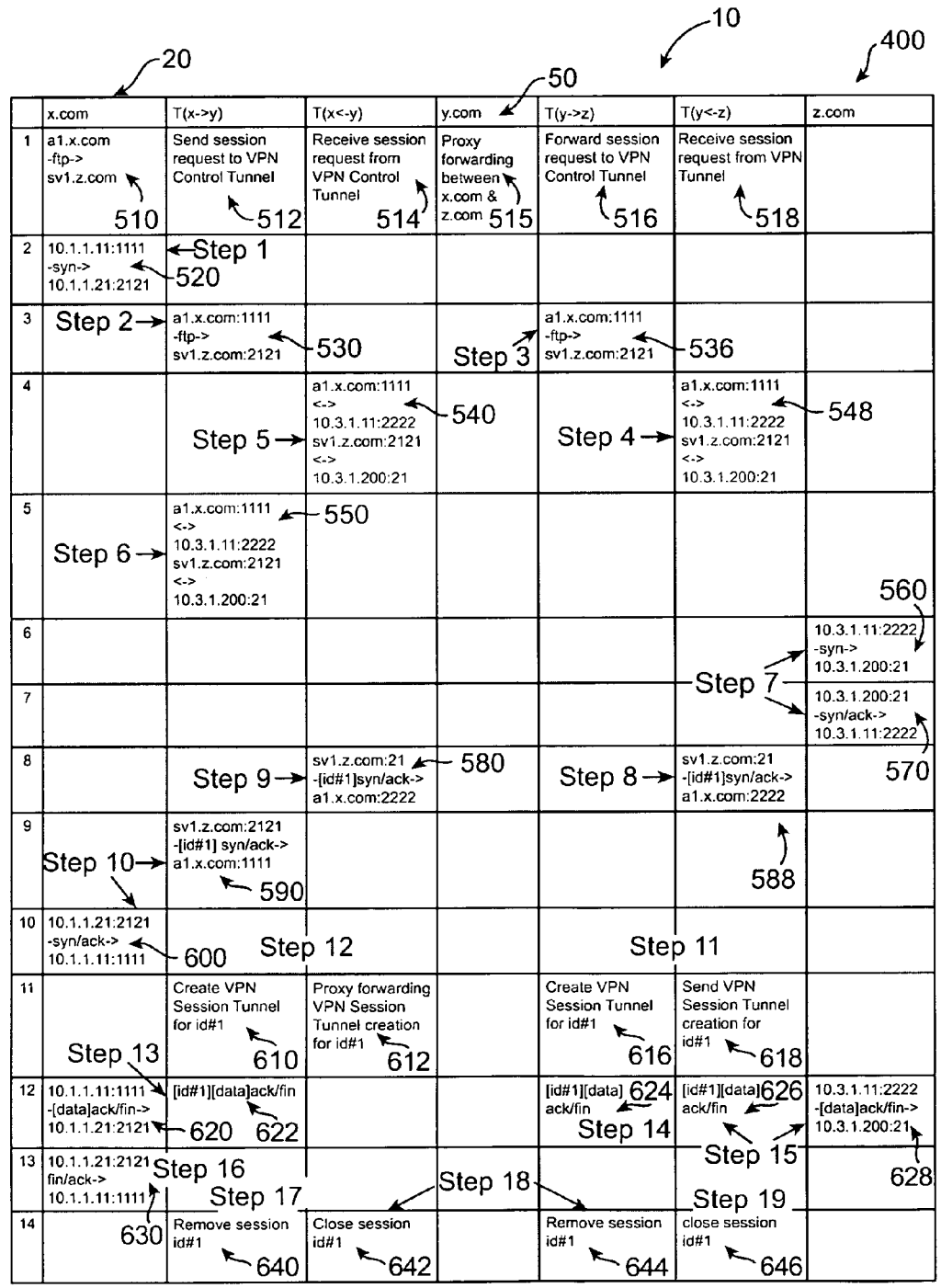
FIG. 11 shows a table relating the packet flow of the remote resource access between two peer VPN nodes via an intermediate node in accordance with the embodiment as shown in FIGS. 9 and 10.

FIG. 11 shows a table relating to proxy forwarding packet flow among the first, the second, and the third DVPN proxy servers to serve a client request to a remote resource via an intermediate VPN node in accordance with the embodiment as shown in FIGS. 9 and 10. The system 10 includes a client a1.x.com on the first VPN node x.com 20 accessing a remote resource sv1.z.com on the third VPN node z.com 400 via the second VPN node y.com 50, which has the second DVPN proxy server having two pieces: T(x<-y) to interact with the first DVPN proxy server T(x->y) and T(y->z) to interact with the third DVPN proxy server T(y<-z). One of the functions of the second DVPN proxy server is to proxy forwarding traffic between x.com and z.com 515. FIG. 1, row 1 shows that the client wants to access an ftp server: a1.x.com-ftp->sv1.z.com 510. The first DVPN proxy server T(x->y) sends the session request 512 to the VPN Control Tunnel 92 (FIG. 9), which connects to the second DVPN proxy server T(x<-y) and the second DVPN proxy server T(x<-y) receives the session request 514 from the VPN Control Tunnel 92. After receiving the session request 514, the second DVPN proxy server T(y->z) forwards the session request 516 to the VPN Control Tunnel 96 (FIG. 9) and the third DVPN proxy server T(y<-z) receives the session request 518 from the other end.

The proxy forwarding packet flow in FIG. 11 shows the step sequence in FIG. 9.

Step 1: The client a1.x.com 32 sends a TCP sync packet 10.1.1.11:1111-syn->10.1.1.21:2121 (FIG. 1, 520) requesting (remote) access to sv1.z.com on z.com 400. The destination IP address 10.1.1.21:2121 of sv1.z.com is a local IP address on the first VPN node x.com 20.

Step 2: On behalf of the (remote) resource, the first DVPN proxy server T(x->y) sends a1.x.com:1111-ftp->av1.z.com:2121 (FIG. 11, 530) to the second DVPN proxy server T(x<-y)/T(y->z) via the VPN Control Tunnel 92. The mapping information on names and IP addresses are shown in FIG. 10.

Step 3: The second DVPN proxy server T(x<-y)/T(y->z) forwards a1.x.com:1111-ftp->sv1.z.com:2121 (FIG. 11, 536) to the third DVPN proxy server T(y<-z) via the VPN Control Tunnel 96 (FIG. 9).

Step 4: The third DVPN proxy server T(y<-z) assigns a local IP address 10.3.1.11:2222 to a1.x.com:1111 and sends this information with sv1.z.com:2121 local IP address 10.3.1.200:21 (FIG. 11, 548) to the second DVPN proxy server T(x<-y)/T(y->z) via the VPN Control Tunnel 96. The client has port number 1111 on the first VPN node x.com 20 and port number 2222 on the third VPN node z.com 400. The resource has port number 2121 on the first VPN node x.com 20 and port number 21 on the third VPN node z.com 400.

Step 4a: Optionally, the third proxy server performs AAA checking to authenticate and authorize the requested access.

Step 5: The second DVPN proxy server T(x<-y) forwards a1.x.com:1111<->10.3.1.11:2222 sv1.z.com:2121<->10.3.1.200:21 (FIG. 11, 540) to the first DVPN proxy server T(x->y) via the VPN Control Tunnel 92 (FIG. 9).

Step 6: The first DVPN proxy server T(x->y) receives a1.x.com:1111<->10.3.1.11:2222 sv1.z.com:2121<->10.3.1.200:21 (FIG. 11, 550) which contains the client and the resource names and their local IP addresses and port numbers on the third VPN node z.com 400.

Step 7: On behalf of the client a1.x.com on the first VPN node x.com 20, the third DVPN proxy server T(y<-z) sends a TCP syn packet (10.3.1.11:2222-syn->10.3.1.200:21, FIG. 11, 560) to the resource sv1.z.com. The source IP address 10.3.1.11:2222 is a local IP address and port number for the (virtual) client a1.x.com on the third VPN node z.com 400. The destination IP address 10.3.1.200:21 is the local IP address and port number of the resource sv1.z.com on the third VPN node z.com 400. The resource sv1.z.com responds back with a TCP syn/ack packet (10.3.1.200:21-syn/ack->10.3.1.11:2222, FIG. 11, 570).

Step 8: Upon receiving the TCP syn/ack packet (FIG. 11, 570), the third DVPN proxy server T(y<-z) sends sv1.z.com:21-[id#1]syn/ack->a1.x.com:2222 (FIG. 11, 588) to the second DVPN proxy server T(x<-y)/T(y->z) via the VPN Control Tunnel 96 in FIG. 9 notifying that the resource sv1.z.com on the third VPN node 400 is available and ready for the client a1.x.com on the first VPN node 20 to access. The third DVPN proxy server generates a unique identifier id#1, using a hashing function based on the client name and the resource name and/or any suitable method which can uniquely be re-generated by any of theses three proxy servers. The unique identifier id#1 can be used by the three proxy servers to identify data traffic exchanged through the VPN Session Control Tunnels between the client a1.x.com 32 and the server sv1.z.com 412.

Step 9: The second DVPN proxy server T(x<-y)/T(y->z) receives sv1.z.cdm:21-[id#1]syn/ack->a1.x.com:2222 (FIG. 11, 580) and forwards to the first DVPN proxy server T(x->y) via the VPN Control Tunnel 92 in FIG. 9.

Step 10: Upon receiving the notification, the first DVPN proxy server maps the sv1.z.com:21 to sv1.z.com:2121 and a1.x.com:2222 to a1.x.com:1111 (FIG. 11, 590). Port numbers 2121 and 1111 are local port numbers for the resource sv1.z.com and the client a1.x.com on the first VPN node x.com 20. The mapping is based on information exchanged in Steps 4, 5, and 6 (FIG. 11, 548, 540, 550 respectively). The first DVPN proxy server T(x->y), on behalf of the (remote) resource sv1.z.com, then sends a TCP syn/ack packet, 10.1.1.21:2121-syn/ack->10.1.1.11:1111 (FIG. 11, 600) to the client a1.x.com.

Step 11: In parallel, the third DVPN proxy server T(y<-z) sends a VPN Session Tunnel creation request for the unique identifier id#1 (FIG. 11, 618) to the second DVPN proxy server T(y->z) via the VPN Control Tunnel 96. The second proxy server T(y->z) then creates the VPN Session Tunnel 98 for unique identifier id#1 (FIG. 11, 616).

Step 12: The second DVPN proxy server T(x<-y) forwards the VPN Session Tunnel creation request for id#1 (FIG. 11, 612) to the first DVPN proxy server T(x->y) via the VPN Control Tunnel 92. The first DVPN proxy server T(x->y) then creates the VPN Session Tunnel 94 for id#1 (FIG. 11, 610). After the establishment of the VPN Session Tunnels 94 and 98 (FIG. 9), the client a1.x.com 32 and the (remote) resource sv1.z.com 412 can communicate (exchange data) securely as though they are local on the same VPN node. The first, the second, and the third DVPN proxy servers route the exchanged data through VPN Session Tunnels 94 and 98.

Step 13: Upon completion of the data exchange, the client a1.x.com 32 sends the TCP packet 10.1.1.11:1111-[data]ack/fin->10.1.1.21:2121 (FIG. 11, 620). After receiving this packet on behalf of the resource sv1.z.com 412 on the third VPN node 400, the first DVPN proxy server sends [id#1][data]ack/fin (FIG. 11, 622) to the second DVPN proxy server T(x<-y)/T(y->z) via the VPN Session Tunnel 94.

Step 14: The second DVPN proxy server T(y->z) forwards [id#1][data]ack/fin (FIG. 11, 624) to the third DVPN proxy server T(y<-z) via the VPN Session Tunnel 98.

Step 15: Upon receiving [id#1][data]ack/fin (FIG. 11, 626), the third DVPN proxy server T(y<-z), on behalf of the client a1.x.com 32, sends a TCP packet 10.3.1.11:2222->[data]ack/fin->10.3.1.200:21 (FIG. 11, 628) to the resource sv1.z.com 412 on the third VPN node 400.

Step 16: The first DVPN proxy server T(x->y), on behalf of the (remote) resource sv1.z.com 412 on the third VPN node 400, sends a TCP packet 10.1.1.21:2121-fin/ack->10.1.1.11: 1111 (FIG. 11, 630) to the client a1.x.com 32 on the first VPN node 20.

Step 17: The first DVPN proxy server T(x->y) sends Remove session id#1 (FIG.1 1, 640) to the second DVPN proxy server T(x<-y) via the VPN Control Tunnel 92.

Step 18: The second DVPN proxy server T(x<-y)/T(y->z) closes the VPN Session Tunnel 94 associated with id#1 (FIG. 11, 642) and forward Remove session id#1 (FIG. 11, 644) to the third DVPN proxy server T(y<-z) via the VPN Control Tunnel 96.

Step 19: The third DVPN proxy server T(y<-z) closes the VPN Session Tunnel 98 associated with id#1 (FIG. 11, 646).

This completes the access of the client a1.x.com 32 to the (remote) resource sv1.z.com 412.

Alternative embodiments of the invention also may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method of application level content routing using a Dynamic VPN (DVPN) dual-proxy mechanism comprising:

establishing a virtual private network (VPN) Control Tunnel between a first virtual private network node and a second network node;

providing at least one client on the first virtual private network node a list of available resources hosted on the second virtual private network node;

initiating a request by the at least one client for at least one resource from the list of available resources hosted on the second virtual private network node as though the at least one resource is local to the at least one client and without exposing actual IP addresses of the list of available resources on the second virtual private network node to the at least one client;

routing the request to the at least one resource through the VPN Control Tunnel and establishing a VPN Session Tunnel between the first virtual private network node and the second virtual private network node;

responding to the request by the at least one resource on the second virtual private network node as though the request is initiated locally on the second virtual private network node and without exposing an actual IP address of the at least one client on the first virtual private network node to the at least one resource; and routing the response from the second virtual private network node back to the at least one client on the first virtual private network node through the VPN Session Tunnel.

2. The method of claim 1, wherein the VPN Control Tunnel and the VPN Session Tunnel between the at least one client and the at least one resource is established between a first virtual private network gateway on the first virtual private network node and a second virtual private network gateway on the second virtual private network node.

3. The method of claim 1, further comprising a first DVPN proxy server on the first virtual private network node and a second DVPN proxy server on the second virtual private network node.

4. The method of claim 3, wherein the first and second DVPN proxy servers are independent servers.

5. The method of claim 3, wherein the first and second DVPN proxy servers are independent servers on an associated virtual private network gateway.

6. A method of application level content routing using a Dynamic VPN (DVPN) dual-proxy mechanism comprising a first DVPN proxy server on a first virtual private network node and a second DVPN proxy server on a second virtual private network node, the method comprising:

establishing a virtual private network (VPN) Control Tunnel between the first virtual private network node and the second virtual private network node;

providing at least one client on the first virtual private network node a list of available resources hosted on the second virtual private network node;

initiating a request by the at least one client for at least one resource from the list of available resources hosted on the second virtual private network node as though the at least one resource is local to the at least one client and without exposing actual IP addresses of the list of available resources on the second virtual private network node to the at least one client, and wherein the at least one resource on the second virtual private network node is provisioned to the first DVPN proxy server, and a local IP address and/or a local name on the first virtual private network node is assigned to the at least one resource;

routing the request to the at least one resource through the VPN Control Tunnel and establishing a VPN Session Tunnel between the first virtual private network node and the second virtual private network node;

responding to the request by the at least one resource on the second virtual private network node as though the request is initiated locally on the second virtual private network node and without exposing an actual IP address of the at least one client on the first virtual private network node to the at least one resource; and routing the response from the second virtual private network node back to the at least one client on the first virtual private network node through the VPN Session Tunnel.

7. The method of claim 6, wherein the local IP address on the first node of the at least one resource is obtained using an IP pool of addresses configured on a first virtual private network gateway on the first virtual private network node.

8. The method of claim 6, wherein the local IP address on the first node of the at least one resource is obtained using a DHCP server on the first virtual private network node.

9. The method of claim 6, wherein a domain name system (DNS) server is used to provide the at least one client with the local IP address on the first virtual private network node when the at least one client is requesting the at least one resource by name.

10. The method of claim 3, wherein the first DVPN proxy server acts as a virtual resource which is on the second virtual private network node, for the at least one client on the first private virtual network node after provisioning, and further wherein the first DVPN proxy server can receive the request to access the at least one resource from the at least client using a local IP address on the first private virtual network node.

11. The method of claim 3, wherein the initial request is communicated via the virtual private network (VPN) Control Tunnel from the first DVPN proxy server to the second DVPN proxy server.

12. The method of claim 3, wherein the second DVPN proxy server has a local IP address on the second virtual private network node for the at least one client on the first virtual private network node, and wherein the local IP address on the second virtual private network node of the at least one client is obtained using an IP pool of addresses configured on a second virtual private network gateway on the second virtual private network node or a DHCP server on the second virtual private network node.

13. The method of claim 3, wherein the second DVPN proxy server initiates the request on behalf of the at least one client to the at least one resource on the second private network node.

14. The method of claim 3, wherein the first and the second DVPN proxy servers establish the virtual private network (VPN) Session Tunnel after processing the initial request from the at least one client to the at least one resource between the first and the second DVPN proxy servers via the virtual private network (VPN) Control Tunnel.

15. The method of claim 3, wherein the first and the second DVPN proxy servers route data exchange between the at least one client and the at least one resource via the virtual private network (VPN) Session Tunnel using an unique session identifier which is created based on a client name, a resource name and an IP addresses on the second virtual private network node.

16. The method of claim 3, wherein the first and the second DVPN proxy servers close and remove the virtual private network (VPN) Session Tunnel when the at least one client and the at least one resource finish their data exchange.

17. The method of claim 1, further comprising an authentication and authorization system, wherein the authentication and authorization system authenticates and authorizes each access request.

18. The method of claim 3, wherein the first and second DVPN proxy servers create a plurality of virtual private network Session Tunnels from an initial virtual private network Session Tunnel to support application protocols that use a plurality of IP (Internet Protocol) ports.

19. The method of claim 3, wherein the first and the second DVPN proxy servers perform content re-write to map embedded IP addresses and port numbers on the first and second virtual private network nodes to support an application protocol.

20. The method of claim 1, wherein the at least one client accesses the at least one resource through a plurality of intermediate virtual private network nodes with a DVPN proxy server in each of the plurality of intermediate virtual private network nodes.

21. The method of claim 1, wherein the at least one client comprises a plurality of clients on the first network node, and wherein the plurality of clients access a plurality of resources on the second virtual private network node.

22. The method of claim 1, wherein the second virtual private network node is configured to host a plurality of local resources, which are accessible by at least one client on the first virtual private network node.

23. The method of claim 1, wherein the at least one resource is routed through the VPN Session Tunnel without disclosing a network topology of the at least one client and/or the at least one resource.

24. A method of application level content routing using a Dynamic VPN (DVPN) dual-proxy mechanism comprising:

establishing a virtual private network (VPN) Control Tunnel between a first virtual private network node and a second network node;

providing at least one client on the first virtual private network node a list of available resources hosted on the second virtual private network node;

initiating a request by the at least one client for at least one resource from the list of available resources hosted on the second virtual private network node as though the at least one resource is local to the at least one client and without disclosing a network topology of the list of available resources on the second virtual private network node to the at least one client;

routing the request to the at least one resource through the VPN Control Tunnel and establishing a VPN Session Tunnel between the first virtual private network node and the second virtual private network node;

responding to the request by the at least one resource on the second virtual private network node as though the request is initiated locally on the second virtual private network node and without disclosing a network topology of the at least one client on the first virtual private network node to the at least one resource; and routing the response from the second virtual private network node back to the at least one client on the first virtual private network node through the VPN Session Tunnel.

25. The method of claim 1, further comprising hosting the at least one resource on a third virtual private network node, and wherein the second virtual private network node performs proxy forwarding for communications between the at least one client and the at least one resource hosted on the third virtual private network node, and without disclosing a network topology of either the second or third virtual private network node to the at least one client.

26. The method of claim 1, further comprising establishing a virtual private network (VPN) Control Tunnel and at least one VPN Session Tunnel between the second and a third virtual private network nodes.

* * * * *